US010415642B2

(12) United States Patent
Serafini et al.

(10) Patent No.: US 10,415,642 B2
(45) Date of Patent: Sep. 17, 2019

(54) COUPLING SYSTEM OF A SEALING ASSEMBLY WITH A ROTATING ANNULAR ELEMENT

(71) Applicants: Andrea Serafini, Pinerolo (IT); Luca Tedeschini, Airasca (IT)

(72) Inventors: Andrea Serafini, Pinerolo (IT); Luca Tedeschini, Airasca (IT)

(73) Assignee: Aktiebolaget SKF, Göteborg (SE)

( * ) Notice: Subject to any disclaimer, the term of this patent is extended or adjusted under 35 U.S.C. 154(b) by 191 days.

(21) Appl. No.: 15/171,062

(22) Filed: Jun. 2, 2016

(65) Prior Publication Data

US 2016/0363168 A1 Dec. 15, 2016

(30) Foreign Application Priority Data

Jun. 9, 2015 (IT) .......................... 102015000021905

(51) Int. Cl.
*F16C 33/00* (2006.01)
*F16C 33/78* (2006.01)
*F16C 33/58* (2006.01)
*F16C 19/14* (2006.01)

(52) U.S. Cl.
CPC ............ *F16C 33/78* (2013.01); *F16C 33/583* (2013.01); *F16C 33/783* (2013.01); *F16C 33/7816* (2013.01); *F16C 33/7889* (2013.01); *F16C 19/14* (2013.01); *F16C 2300/02* (2013.01)

(58) Field of Classification Search
CPC .. F16C 33/7816; F16C 33/7889; F16C 19/02; F16C 19/14; F16C 33/583; F16C 33/78; F16C 33/783; F16C 2300/02
See application file for complete search history.

(56) References Cited

U.S. PATENT DOCUMENTS

| 4,376,541 | A | * | 3/1983 | Walter | ................ F16C 33/7869 277/353 |
| 4,545,692 | A | * | 10/1985 | Bras | .................... B60B 27/0005 384/477 |
| 4,863,292 | A | * | 9/1989 | Dreschmann | ......... F16C 33/783 277/353 |
| 5,148,104 | A | * | 9/1992 | Ishikawa | ................. G01P 3/443 188/181 R |

(Continued)

FOREIGN PATENT DOCUMENTS

| DE | 3806928 A1 | 9/1989 |
| EP | 0807775 A1 | 11/1997 |

(Continued)

*Primary Examiner* — Matthew R McMahon
(74) *Attorney, Agent, or Firm* — Bryan Peckjian; SKF USA Inc. Patent Dept.

(57) ABSTRACT

Coupling system of a sealing assembly that has an annular rotating element, the seal assembly provides an annular screen providing a sleeve portion to be integrally coupled with the annular element rotating and a flange portion that protrudes radially from the sleeve portion. The sleeve portion by coupling with a seat mounting of the annular rotating element defined by an outer cylindrical surface of the mounting and including a first circumferential discontinuity cooperating with the sleeve portion to locally increase a reaction force of the cylindrical surface at the first circumferential discontinuity due to elastic radial pressure exerted by the sleeve portion on the mounting seat.

4 Claims, 1 Drawing Sheet

(56) References Cited

U.S. PATENT DOCUMENTS

| | | | | |
|---|---|---|---|---|
| 5,435,654 A * | 7/1995 | Ishida | ............... | F16C 33/783 384/488 |
| 6,637,754 B1 * | 10/2003 | Ohtsuki | ............... | F16C 19/186 277/549 |
| 7,591,593 B2 * | 9/2009 | Tsujimoto | ............ | F16C 33/7896 384/486 |
| 8,002,475 B2 * | 8/2011 | Serafini | ............... | F16C 41/007 384/448 |
| 8,246,253 B2 * | 8/2012 | Masui | ............... | F16C 33/7859 384/484 |
| 8,851,757 B2 * | 10/2014 | Serafini | ............... | F16C 41/007 384/448 |
| 8,870,464 B2 * | 10/2014 | Yoshizaki | ............ | F16C 19/02 384/463 |
| 8,915,649 B2 * | 12/2014 | Seki | ............... | F16C 33/723 384/448 |
| 9,016,949 B2 * | 4/2015 | Baratti | ............... | B60B 27/0005 384/448 |
| 9,169,876 B2 * | 10/2015 | Baratti | ............... | B60B 27/0005 |
| 9,505,267 B2 * | 11/2016 | Gemello | ............... | F16C 33/723 |
| 9,506,554 B2 * | 11/2016 | Sone | ............... | F16C 19/364 |
| 2007/0211978 A1 * | 9/2007 | Engesser | ............... | F16C 33/78 384/517 |
| 2008/0310782 A1 * | 12/2008 | Walter | ............... | F16J 15/3264 384/486 |
| 2015/0071581 A1 * | 3/2015 | Gieser | ............... | F16C 33/7886 384/559 |
| 2015/0176654 A1 * | 6/2015 | Back | ............... | F16C 33/805 384/480 |

FOREIGN PATENT DOCUMENTS

| | | | | |
|---|---|---|---|---|
| EP | 2469110 A1 | | 6/2012 | |
| JP | 2008039142 A | | 2/2008 | |
| JP | 2012102767 A | * | 5/2012 | ............ F16C 33/667 |
| WO | 2007/071230 A1 | | 6/2007 | |

* cited by examiner

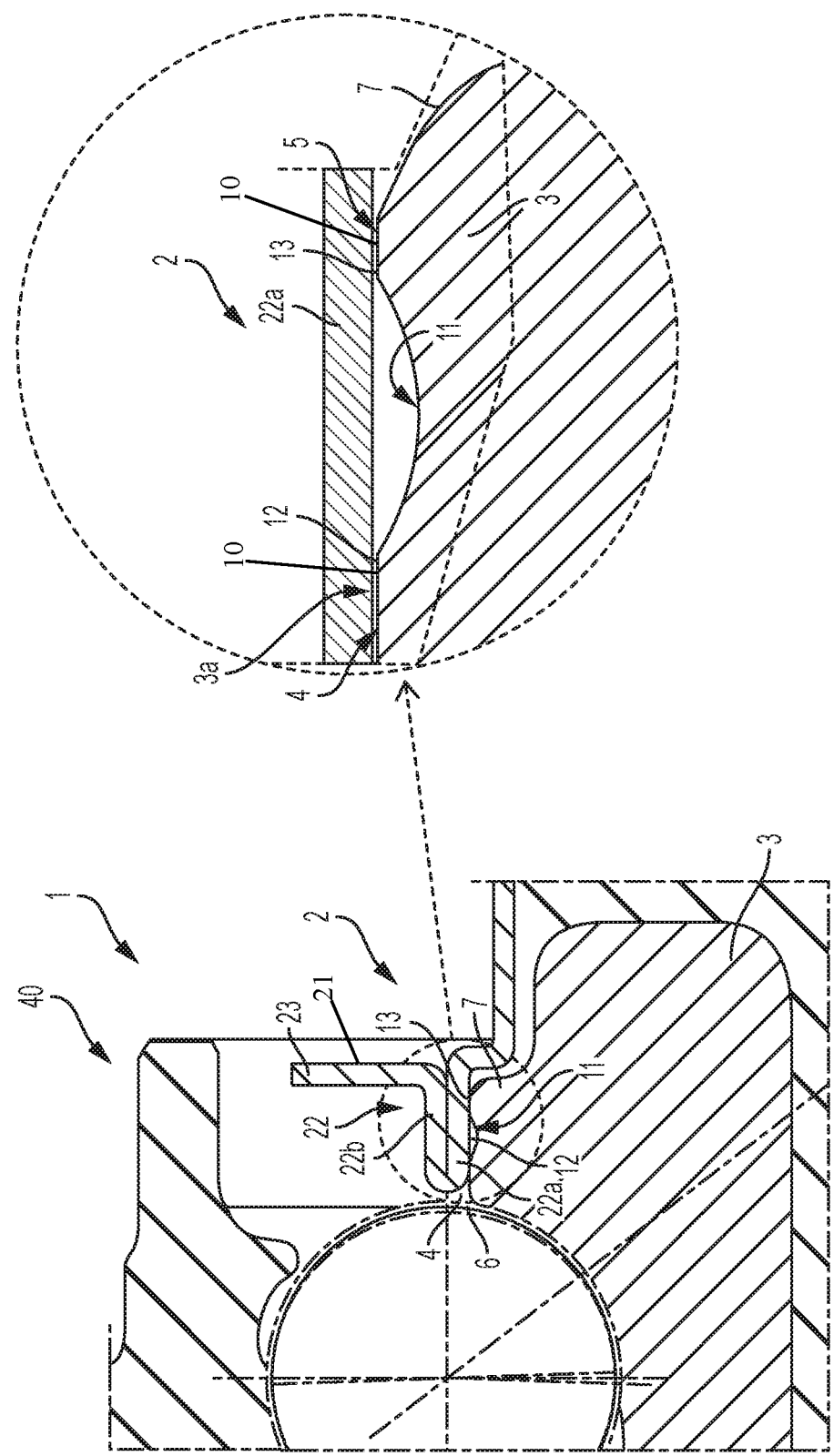

COUPLING SYSTEM OF A SEALING ASSEMBLY WITH A ROTATING ANNULAR ELEMENT

CROSS-REFERENCE TO RELATED APPLICATIONS

This application claims priority to Italian patent application no. 102015000021905 filed on Jun. 9, 2015, the contents of which are fully incorporated herein by reference.

FIELD OF THE INVENTION

The present invention relates to a coupling system of a sealing assembly with a rotating annular element.

BACKGROUND OF THE INVENTION

Normally, within the framework of the rolling bearings, which the present invention will refer without thereby losing generality, the seal assemblies include an annular screen having a sleeve portion, which is coupled with a rotating annular element, in particular a bearing ring, by means of a mounting by interference in order to render angularly and axially integral with each other the annular screen and the rotating annular element.

Such fittings for interference occur, normally, by placing on the annular shield, or on a part of it, an axial thrust linearly increasing intensity with increasing progressively in surface engagement between the sleeve portion and the rotating annular element. The annular screen is normally realized in a printed metal sheet and sheared so that, after assembly, the sleeve portion showing resiliently compressible against the seat assembly, and such that the radial compression of the sleeve portion exerted on the mounting seat causes a reaction force of the cylindrical surface of sufficient material to prevent any sealing of the screen shifts.

Despite the precision in the positioning and in the assembly of annular screens of the seal assemblies, coupling systems of the type described above have not proved sufficiently reliable in terms of use, or under mechanical and thermal stress, having been found during some tests and operations of maintenance of the movement, albeit minor, the screens themselves than in the bearing rings, or with respect to the nominal design conditions.

SUMMARY OF THE INVENTION

The object of the present invention is to provide a coupling system of a sealing assembly with a rotating annular element free from the drawbacks described above.

According to the present invention there is provided a coupling system of a sealing assembly with a rotating annular element.

BRIEF DESCRIPTION OF THE DRAWING

The invention will now be described with reference to FIG. 1, which, in section, illustrates a preferred embodiment of a coupling system of a sealing assembly with a rotating annular element of the present invention.

DETAILED DESCRIPTION

With reference to the attached drawing, numeral 1 indicates as a whole a coupling system of a sealing assembly 2 with a rotating annular element 3, in particular a bearing ring 40.

The sealing assembly 2 is adapted to prevent the entry of contaminating material within the bearing 40, and provides an annular screen 21, which is keyed on a radial outer cylindrical surface 3a of the rotating annular element 3, and is normally made of a molded sheet metal and sheared. The screen 21 includes a sleeve portion 22 intended, in use, to couple integrally with the rotating annular element 3 and a flange portion 23 that projects in cantilever fashion, in the radial direction, from the sleeve portion 22, and is shaped in such a way that, after fitting, the sleeve portion 22 is elastically compressible on the rotating annular element 3 against the surface 3a, and such radial compression ring 3 causes a reaction force directed in the direction radially opposite to portion 22 and towards the sleeve itself.

In the embodiment illustrated in the annexed figure, the sleeve portion 22 is defined by two cylindrical layers 22a and 22b folded back on themselves, to which the layer 22a is mounted on the contact surface of the radial cylindrical outer surface 3a, and the layer 22b is connected, on the one hand, with the layer 22a and, by an axially opposite side to the preceding side, with the portion 23 to the flange. However, the sleeve portion 22 may assume different geometries and conformations depending on the type of annular screen 21 adopted, for example, alternatively to that shown in the attached figure, it may be composed of a single layer instead of two radially superimposed layers, but as here notes for the purposes of the present invention is that it is force fit onto the rotating annular element 3 being the geometry of an example non-limiting embodiment.

The coupling system 1 is adapted to influence the magnitude and distribution of the aforementioned restraining reaction between the surface 3a and the sleeve portion 22 and includes a mounting seat 10 to allow coupling of the sleeve portion 22 with the rotating annular element 3.

The contact between the seat 10 and the mounting portion 22 in the sleeve, or the elastic action of the sleeve portion 22, radially directed toward a rotation axis (not shown) of the bearing 40, determines a reaction force opposite and proportional entity the extension of the surface of mutual contact between the seat 10 and the mounting portion 22 in sleeve: in the known case in which there is full communion between the seat 10 and the mounting portion 22 in the sleeve, the restraining reaction is, in line of maximum, uniformly distributed along any contact director between the seat 10 and the mounting portion 22 in the sleeve.

In the embodiment illustrated in the annexed figure, the seat assembly 10 includes a groove 11 or the annular groove formed in the ring 3 through the surface 3a and two annular edges, or circumferential discontinuities, 12 and 13, which axially bound the groove 11 and cooperate with the sleeve portion 22 to increase locally, i.e., at the edges 12 and 13 same, the restraining reaction of the cylindrical surface 3a due to the resilient radial pressure exerted by the sleeve portion 22 on the seat assembly. The groove 11 locates on the surface of the ring 3 two zones 4 and 5 cylindrical surface disposed axially on opposite sides of the groove 11 and of which the zone 4 is axially bounded by the edge 12 and an edge 6 of the rotating annular element 3, while zone 5 is axially bounded by the edge 13 and by a rounded edge 7 of the outer ring 3.

The presence of both the groove 11 and, above all, of the edges 13 determines, along a director any contact between the seat 10 and the mounting portion 22 in the sleeve, a constraining distribution of the reaction which will be proportional to the extension of the surface of mutual contact between the seat 10 and the mounting portion 22 to the sleeve along the two zones 4 and 5, and the extent of the local reaction forces at the two annular edges, or circumferential discontinuities, 12 and 13.

The presence of the two annular edges, or circumferential discontinuities, 12 and 13 causes a local increase of the reaction constrain between the seat 10 and the mounting portion 22 in the sleeve of greater intensity to an intensity of the average value of the reaction constrain resulting between the seat 10 mounting portion 22 and the sleeve along the two zones 4 and 5, making it even more stable coupling between the screen 21 and the annular ring 3 rotating.

Furthermore, the groove 11 can be created using the form tools such as to confer to the relative annular rims 12 and 13 respective shaped profiles and such that the stable coupling between the annular screen 21 and the rotary ring 3, to suffer from the aforementioned axis of rotation, according to directions chosen in such a way as to increase even more the stability of the coupling between the annular screen 21 and the ring 3 rotating. By way of example, but not limiting, both edges 12 and 13 may have the same shaped profiles, for example, subtend respective angles of 90°, and the lines of action of the relative binding reactions are directed towards each other forming of the corners with the axis of rotation of amplitude equal to half the amplitude of the angle subtended by the edges 12 and 13 same. In the case where it was necessary to increase the stability of the coupling without acting to the detriment of ease of assembly, can then be provided by the edges of the shaped profiles 12 and 13 should increase the retaining action of the edge 13, and that, instead, facilitate, the action of mounting, i.e., give the edge 12 a restraining reaction of intensity and direction such as not to facilitate assembly of the sleeve portion 22.

The profiling of the edges of the profiles 12 and 13 can be modulated by varying, for example, the radius of curvature of the groove 11.

Finally, to favor the action of stability and retention on the sleeve portion 22, that is, on the screen 21, not only contribute to the constraining reactions exercised by the edges 12 and 13, together with the reaction force proportional to the extension of the surface of mutual contact between the seat 10 and the mounting portion 22 to the sleeve along the two zones 4 and 5, but also contributes elastic contraction within the throat portion 11 of the sleeve 22, which, due to the lack of contact, namely of direct contrast to the radial compression of the sleeve portion 22 exerted on the seat assembly 10 at the throat 11, it tends to penetrate radially into the groove 11 itself once assembly is completed, by determining, therefore, an increase of the coupling constraint between the screen 21 and the ring 3.

Therefore, if the normal reaction force due to the hammering of the screen 21 on the ring 3 at the zones 4 and 5 also adds the effect of the reaction value constrain localized along the edges 12 and 13, resulting an increase in stability of the hammering the same without any change of the screen 21, and, not even ring 3 to the realization of the groove part 11. That is, the coupling system 1 described above allows in an extremely simple and economical way to couple in a much more stable and reliable the complex 2 with the sealing ring 3 without, for another, requiring any increase of the thrust of the hammering.

The invention claimed is:

1. A combination of a coupling system and a sealing unit, the coupling system comprising:
   an annular rotating member, the annular rotating member defining a mounting seat, the mounting seat comprising an annular groove bordered on axial sides thereof by a first circumferential discontinuity and a second circumferential discontinuity, the first circumferential discontinuity and the second circumferential discontinuity cooperate with a tubular portion of the sealing unit in order to locally increase a reaction force of a mounting cylindrical external surface,
   the sealing unit comprising:
   an annular shield provided with the tubular portion that is coupled with the annular rotating member such that the tubular portion compresses the annular rotating member and is positioned on the mounting seat extending over the first circumferential discontinuity, the annular groove, and the second circumferential discontinuity, wherein the tubular portion is formed by two cylindrical layers folded back on themselves, the tubular portion not protruding into the annular groove, the tubular portion directly contacting the first circumferential discontinuity and directly contacting the second circumferential discontinuity, the annular groove being free of material therein such that, when viewed in cross-section, the tubular portion and the annular groove define an empty space therebetween; and
   a flanged portion that radially protrudes cantilevered from the tubular portion; wherein the tubular portion is coupled with the mounting seat of the rotating member and is bordered by the mounting cylindrical external surface that provides the first circumferential discontinuity that cooperates with the tubular portion in order to increase locally in correspondence to the same first circumferential discontinuity a reaction force of the mounting cylindrical external surface; the reaction force being due to a radial elastic pressure exercised by the tubular portion against the mounting seat, wherein the sealing unit is free of elastomeric material.

2. The combination according to claim 1, wherein the mounting seat has the second circumferential discontinuity that is parallel to the first circumferential discontinuity, and cooperates with the tubular portion in order to locally increase a reaction force of the mounting cylindrical external surface in correspondence to the second circumferential discontinuity; the reaction force being due to a radial elastic pressure applied by the tubular portion against the mounting seat.

3. The combination according to claim 1, wherein the first and second circumferential discontinuity subtend respective contact angles that define the direction and the size of the relevant reaction forces.

4. The combination according to claim 1, wherein the annular shield is made of metallic sheet that is machined and sheared so that the tubular portion can be elastically squeezable against the mounting seat.

* * * * *